United States Patent [19]
Kuckes

[11] Patent Number: 5,343,152
[45] Date of Patent: Aug. 30, 1994

[54] ELECTROMAGNETIC HOMING SYSTEM USING MWD AND CURRENT HAVING A FUNAMENTAL WAVE COMPONENT AND AN EVEN HARMONIC WAVE COMPONENT BEING INJECTED AT A TARGET WELL

[75] Inventor: Arthur F. Kuckes, Ithaca, N.Y.
[73] Assignee: Vector Magnetics, Ithaca, N.Y.
[21] Appl. No.: 970,048
[22] Filed: Nov. 2, 1992
[51] Int. Cl.$^5$ .................. G01V 3/26; G01V 3/24
[52] U.S. Cl. .................. 324/346; 324/356; 175/45; 166/250
[58] Field of Search .............. 324/369, 326, 345, 346, 324/356, 328, 66–67; 175/45; 166/250, 255, 66.5; 392/459

[56] References Cited

U.S. PATENT DOCUMENTS

| | | |
|---|---|---|
| 2,599,687 | 0/1952 | Brant . |
| 3,402,348 | 0/1968 | Hoehn, Jr. et al. . |
| 3,731,752 | 5/1973 | Schad ............................. 175/45 |
| 4,021,774 | 0/1977 | Asmundsson et al. ........... 175/45 |
| 4,323,848 | 4/1982 | Kuckes ............................. 324/338 |
| 4,372,398 | 2/1983 | Kuckes ............................. 175/45 |
| 4,443,762 | 4/1984 | Kuckes ............................. 324/346 |
| 4,502,010 | 2/1985 | Kuckes ............................. 324/346 |
| 4,529,939 | 7/1985 | Kuckes ............................. 324/346 |
| 4,593,770 | 6/1986 | Hoehn, Jr. ........................ 324/346 |
| 4,700,142 | 10/1987 | Kuckes ............................. 324/346 |
| 4,791,373 | 12/1988 | Kuckes ............................. 324/346 |
| 4,901,017 | 2/1990 | Zinke ............................... 324/239 |
| 4,933,640 | 6/1990 | Kuckes ............................. 324/346 |
| 5,074,365 | 12/1991 | Kuckes ............................. 324/346 |
| 5,218,301 | 6/1993 | Kuckes ............................. 324/346 |

Primary Examiner—Kenneth A. Wieder
Assistant Examiner—Jay M. Patidar
Attorney, Agent, or Firm—Jones, Tullar & Cooper

[57] ABSTRACT

Apparatus for measuring magnetic fields while drilling includes an electrode located adjacent or in contact with a target well casing to produce an electrical current. The current including a fundamental wave component having two opposite zero crossings per cycle and an even harmonic wave component having two opposite zero crossings per cycle produces an alternating current magnetic field in the earth surrounding the target well. The target well is to be intercepted by, or to be avoided by, a relief well being drilled. A sensitive magnetometer is located within a nonmagnetic portion of the drill string within the relief well to detect the alternating magnetic field generated by the current flow in the target and to produce unambiguous output signals corresponding to the detected field and determining the distance and direction of the target well from the relief well the determination being made in synchronization with the fundamental wave component to eliminate phase ambiguity in the determination of the direction.

16 Claims, 2 Drawing Sheets

FIG. 1

FIG. 2A FUNDAMENTAL

FIG. 2B 2nd HARMONIC

FIG. 2C RESULTANT

ELECTROMAGNETIC HOMING SYSTEM USING MWD AND CURRENT HAVING A FUNAMENTAL WAVE COMPONENT AND AN EVEN HARMONIC WAVE COMPONENT BEING INJECTED AT A TARGET WELL

BACKGROUND OF THE INVENTION

The present invention relates, in general, to a method and apparatus for injecting electrical current into the earth surrounding a target well and for detecting and measuring magnetic fields produced by such currents during drilling of a relief well. More particularly, the invention relates to a system for injecting alternating currents into the earth and for measuring magnetic fields produced by current flow in nearby cased wells, to determine the distance and direction to such wells, such measurements being accomplished from within a drill string so that removal of the drill string from the well for logging purposes is not required.

In deep well drilling, where wells are commonly drilled to depths in excess of 12,000 ft., it is extremely difficult to track with accuracy the path followed by the drill, since even a very minor deviation in direction can, after several thousand feet of drilling, produce a huge divergence between the actual and intended locations. Because of variations in geologic formations, the high temperatures encountered, and the generally unfavorable conditions which exist in the environment of a deep well, accurate tracking of a well during the course of drilling is extremely difficult. Although numerous techniques have been developed for making such measurements, none have been found to be entirely satisfactory.

Although an accurate determination of well location is always desirable, such information becomes particularly critical in two related situations: first, when an attempt is being made to locate and intercept a well, and second, when an attempt is being made to avoid another well which is known to be located in the general area being drilled. The first situation may occur, for example, when an existing well blows out and it becomes necessary to drill a relief borehole that will intersect the existing, or target well. In these cases, the relief borehole must be started a long distance from the target wellhead; for example, as much as one-half mile away, and must angle down to intersect the target well at a depth of, for example, 10,000 to 15,000 feet. Although the initial part of the drilling can be done using existing directional equipment, a problem arises when the relief borehole nears the target well. Not only must the measurements be made at locations which are thousands of feet below the surface of the earth, but in addition the exact relative locations of the borehole and the well often are not known with sufficient accuracy. The actual paths of both the target well and the relief borehole can deviate substantially from their desired paths during the drilling process, and such deviations often are not measured accurately, particularly during the drilling of the target well. As a result, the target well might not be in its expected location, and the relief borehole can easily intersect it prematurely, or can miss it entirely. Furthermore, even if the location of the target well is accurately known, a slight deviation from the assumed location and direction of the relief well can result in premature intersection with the target well or can cause the relief well to miss the target well entirely.

The second situation noted above, i.e., the need to avoid existing wells, occurs, for example, when several wells are being drilled from a single location, as from an off-shore platform. The problem usually arises when it is desired to add a well between the existing wells while avoiding contact with them. The initial drilling from an off-shore drilling platform may locate a number of well heads at 12 foot intervals, with the wells themselves being directed away from each other in various directions. In order to increase the production from such a drilling platform, it may become desirable to drill new wells between the existing wells so that the well heads will be at 6 foot intervals. However, it is essential that the new wells avoid the existing wells, but even if great care is taken to monitor the location of the drill and the direction of drilling, there is often uncertainty about the exact location of the drill with respect to the existing wells.

It is known that the magnetic and electrical characteristics of the geological formations surrounding a well being drilled can be measured by means of highly sensitive magnetometer systems. In such systems, for example, electrical currents are caused to flow in the strata surrounding the well, with the current flow creating a magnetic field that can be measured. The injected currents do not flow uniformly through the strata, but may be concentrated in conductive anomalies such as the metal casing of a target well, thereby creating a detectable variation in the magnetic field. Such a system is disclosed in U.S. Pat. No. 4,372,398, issued February 1983 and entitled "Method of Determining the Location of a Deep-Well Casing by Magnetic Field Sensing". This patent describes a method for injecting current into the earth surrounding the relief well, with the current flowing to and along the target. The magnetic field resulting from the target current is measured by a highly sensitive magnetic field sensor such as that shown in U.S. Pat. No. 4,323,848, issued Apr. 6, 1982, and entitled "Plural Sensor Magnetometer Arrangement for Extended Lateral Range Electrical Conductivity Logging".

Although such prior systems have been effective, a difficulty has been encountered because of the fact that they cannot provide measurements during the actual drilling of the relief well since they require removal of the drill string and insertion of the measuring equipment to allow logging measurements to be made. Because of the extreme depth of such wells, the removal of a drill string is extremely expensive, and results in a large amount of lost drilling time. Such lost time is particularly critical when an attempt is being made to intercept and shut down a blown out well. Furthermore, on occasion the logging equipment itself becomes stuck in the relief well, further delaying drilling and increasing costs while attempts are made to free it. Since logging measurements must be made more and more often as the relief well approaches the target well, the costs and time delays involved become considerable.

In U.S. Pat. No. 4,529,939, issued Jul. 16, 1985 to Arthur F. Kuckes, and entitled "System Located in Drill String for Well Logging While Drilling", the disclosure of which is hereby incorporated herein by reference, there is described an MWD (measurement while drilling) system for injecting alternating current into strata surrounding a borehole being drilled to produce a current flow in the casing of a target well. This target well current results in a measurable target magnetic field. The system further includes a magnetic field sensor tool within the drill string of the borehole being drilled for measuring the field to determine the distance and direction to the target well casing, the measurement being made without withdrawing the drill string from the borehole being drilled. The bottom-most section of the drill string carries a conventional dynamotor drill bit which may be incorporated in a bent subsection for directional drilling, or in other conventional drill string subsections. Drilling mud under high pressure is supplied through the drill string and through a conventional turbine arrangement in the bent subsection to drive the drill bit. In conventional manner, the mud then flows out of the drill string and back up the borehole being drilled, outside the wall of the drill string, to return to the surface. The drill string is assembled and lowered into the well by means of a suitable derrick, or the like, located at the wellhead, in known manner.

The well logging apparatus of the '939 patent is suspended within the central passageway of the drill string and is supported near the bottom of the drill string, just above the subsection which carries the drill bit. The logging apparatus may be held in place in the drill string by means of a suitable support cable extending the full length of the drill string, or may be a self-contained unit secured in the bottom section of the drill string. In either event, the logging apparatus includes an alternating current emitting electrode located in the drill string bore and a magnetic field sensor tool located a predetermined distance below the electrode.

In a conventional drill string, each drill pipe subsection, or collar, is approximately 30 feet in length, with three subsections making up a full section. In accordance with conventional drilling techniques, the lowermost sections, making up about 300 feet of pipe, may weigh from 100 to 150 pounds per foot. An intermediate portion of the drill string, perhaps the next 600 feet, is conventionally constructed of pipe in the range of 28 pounds per foot, with the remainder of the drill string being constructed of drill pipe having a weight of 15 pounds per foot. The heavy weight of the lower pipe sections is not only for strength, but also serves to place a downward force on the drill bit. At the very bottom of the drill string is a modified collar, or sub, which carries the drill bit. The bit may either be vertical, for straight drilling, or may be angled with respect to the axis of the drill string for directional drilling (i.e., in a "bent" sub), the string being rotated from the surface to orient the drill so that it will advance in the desired direction.

In accordance with the '939 patent, the drill string collar immediately above the drill bit sub is a sensor collar constructed of a non-magnetic high resistivity material such as stainless steel or Monel. This sensor collar is adapted to receive a highly sensitive magnetic field sensor tool which is oriented within the sensor collar by means of a detent or the like. This detent assures a fixed angular relationship between the sensor and the drill string so that when a bent sub is utilized, its direction of travel can be accurately determined by the sensor.

In order to minimize the effect of magnetic fields produced by current flow in the sensor collar itself, the magnetic field sensing tool is held in coaxial relationship with the drill string by means of suitable spacers. Furthermore, the sensor collar is carefully constructed to insure that its inner and outer surfaces are concentric so that any current flow that does occur is equalized around the circumference of the collar, thereby insuring that any stray magnetic fields created in the relief borehole by such a current are essentially cancelled at the axis of the drill string, so that they have minimal or no effect on the field sensor tool.

Current is injected into the earth surrounding the relief borehole, in accordance with the '939 patent, by means of an electrode located within the central bore of the drill string and spaced above the field sensor by a distance sufficient to insure that the current flow within the drill string will not adversely affect the desired field readings. The electrode is preferably mounted within the drill string approximately 70 to 150 feet above the field sensor tool. The electrode might be as close as 30 feet from the field sensor in some cases; generally speaking, however, the further away the electrode is from the sensor, the better. Since the electrical resistance of the drill pipe sections is sufficiently high to force all of the current emitted by the electrode into the surrounding earth within a distance of about 200 feet from the electrode, placing the electrode as much as 300 feet away from the sensor insures that essentially no current remains in the drill string itself in the area of the field sensor, and such an arrangement would be preferred in circumstances where the stray magnetic fields at the sensor tool are to be minimized. However, when operating within, for example, about 10 feet of a cased target well, the magnetic field resulting from current flow in the target is sufficiently strong that the electrode can be quite close to the field sensor without adverse effect from the stray fields produced by current in the drill string. The controlling factor is the magnitude of the magnetic field to be detected.

The provision of a current-injecting electrode in a drill string, although presenting many advantages when the wellhead of a target well is inaccessible, has some disadvantages, since there are current losses in the earth surrounding the relief well which result in a reduced current flow at the target well and which, therefore, produce a smaller target magnetic field for detection by the magnetometer carried by the drill. Furthermore, when the current source is located in the relief well, current flow in the earth around the relief well produces a magnetic field which can interfere with the field produced by current in the target well casing. The smaller the relative magnitude of the target field, the more difficult it is to track, and thus the more difficult it becomes to guide the relief well.

When the wellhead of the target well is accessible, the current injecting electrode can be removed from the drill string and placed on the surface of the earth, near or in contact with the wellhead. A second, ground electrode is spaced as much as one-half mile away from the wellhead.

Preferably, the injecting electrode is connected to the casing of the target well or is placed as close as possible to the wellhead. This injecting electrode is connected by a cable through a source of low frequency alternating current to the ground electrode spaced far away from the target wellhead. The electrical current from the AC source is thus supplied to the casing of the target well and flows downwardly along the casing. By placing the ground electrode at a relatively large distance from the current injecting electrode, the return ground current flow from the target casing is spread out over the length of the casing.

The concentrated current flow in the target well casing produces a corresponding alternating magnetic field in the earth surrounding the casing. If the target well is vertical, the magnetic field is essentially horizontal, and is detectable by a highly sensitive magnetometer located in the borehole being drilled. Although the current flowing in the target well "bleeds" into the surrounding earth, the location of the injecting electrode at or adjacent the wellhead produces sufficient current flow at the depths of interest to provide a magnetic field that can be accurately and reliably detected in the relief borehole by such a magnetometer.

One of the major problems encountered in measurement while drilling (MWD) systems is the transmission of data from the magnetic field sensor in the drill string to computing equipment on the surface. Attempts have been made to transmit data bits representing the detected magnetic field to the surface by means of a transmission line or cable extending the length of the drill string, in the manner generally described in the '939 patent discussed above. However, the environment within a drill string is hostile to such electrical cables and to the signals which they carry, with the result that data can be lost, or the received data can be incorrect. This can produce significant errors in the calculations of distance and direction, and can result in erroneous instructions to the drill operator, producing at best a loss in time and money and at worst a premature intersection with a blow-out well and consequent injury to the drilling crew.

In order to avoid the problems of direct transmission of data on a wireline, attempts have been made to transmit the data by way of pressure pulses in the drilling mud, in the manner described in U.S. Pat. No. 4,021,774 to Asmundson et al. However, the amount of information that can be transmitted by this technology is very limited, since only about one to about ten pulses per second are available, and such a bit rate is completely inadequate for the amount of data required to produce accurate and reliable distance and direction calculations in a measurement-while-drilling system. The reason for this is that the magnetic field being detected at the drill string is very small, on the order of 100 microamperes per meter, and to measure such fields it is necessary to accumulate readings over a relatively long period of time, and to average the signals over that time. This is usually done in a computer located at the surface, but with a bit rate of one to ten pulses a second, such averaging is impractical.

One suggested solution to the foregoing difficulties is the use of downhole processing, where data averaging is carried out before the signals are transmitted uphole. However, difficulties occur even in downhole processing due to the fact that it is extremely difficult to maintain synchronization between the source which produces the ground currents and the downhole processing circuitry. Without proper synchronization, the phase of the magnetic field signals being detected is not known, and there is a 180° ambiguity in the resulting data. Fluid telemetry cannot be used to provide the necessary synchronization because its data rate is too low, as noted above. Synchronized clocks at the surface and downhole are not generally a satisfactory solution, because even quartz-controlled clocks drift, particularly in the conditions which exist at the bottom of a borehole. Even with one part per million accuracy, the drift of a quartz-controlled clock is 1/10 second per day.

SUMMARY OF THE INVENTION

It is therefore, an object of the present invention to provide improved accuracy in distance and direction measurements in a downhole measurement-while-drilling (MWD) system.

In accordance with the present invention, accurate and reliable calculations of the distance and direction from a borehole being drilled to a target well can be obtained in an MWD system by the use of downhole signal processing, and by accurately synchronizing such processing with the generation of the electric ground currents which are used to produce the magnetic field being detected. This synchronization is achieved by means of a surface current generator which produces a two-component ground current containing two harmonic frequencies, which frequencies produce a resultant magnetic field having identifiable phase characteristics which are detected by the field sensor to produce corresponding output signals for processing. The sensor tool includes a highly sensitive alternating magnetic field detector, such as the magnetometer described in U.S. Pat. No. 4,933,640 of Arthur F. Kuckes issued Jun. 12, 1990, the disclosure of which is incorporated herein by reference, for detecting the two harmonic magnetic fields. The sensor tool also includes an inclinometer for measuring the vector components of gravitational forces at the location of the sensor to thereby measure the slope of the borehole being drilled, and further includes a compass for measuring the vector components of the earth's magnetic field at the sensor location.

The signals from the magnetometer, inclinometer, and compass are supplied sequentially, as by a suitable multiplexer, to an analog-to-digital converter, in the manner illustrated, for example, in the aforesaid U.S. Pat. No. 4,933,640. The sensed data signals are supplied to a downhole computer, where all the necessary calculations are performed. The harmonic signals permit resolution of phase ambiguities so that these calculations provide the distance and direction to the target well, in addition to the orientation of the drill bit, with a high degree of accuracy and reliability, thereby allowing the drill operator to redirect the drill bit so as to continue drilling of the borehole in a desired direction. The distance, direction, and orientation information to be sent to the surface is encoded and is then transmitted to the surface by conventional mud pulses which provide a sufficiently large data rate to permit the computed data, rather than the raw data, to be transmitted in a relatively short time, and with reliable accuracy. As a result, measurement while drilling becomes a viable technique for guiding the drilling of a relief borehole in the vicinity of one or more existing wells.

BRIEF DESCRIPTION OF THE DRAWINGS

The foregoing and additional objects, features and advantages of the present invention will become apparent from a consideration of the following detailed description of preferred embodiments thereof, taken in conjunction with the accompanying drawings, wherein.

DESCRIPTION OF PREFERRED EMBODIMENT

Figure 1:
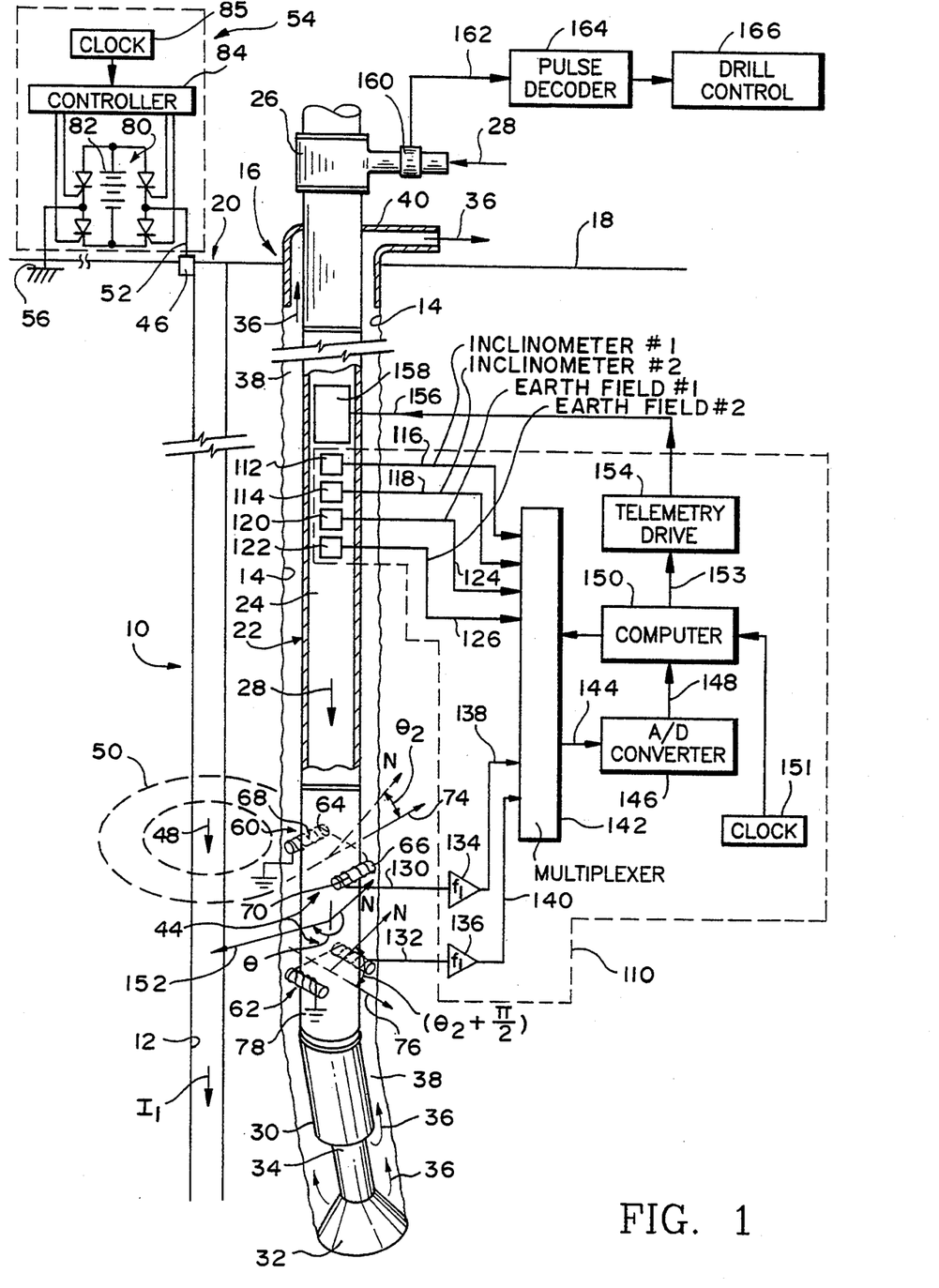
FIG. 1 is a partial sectional view of a target well and a relief borehole incorporating current injection and field detection apparatus in accordance with the present invention.

Turning now to the drawing, there is illustrated in FIG. 1 a target well 10 having a casing 12. The target well may be an abandoned or a producing oil or gas well which exists in a field and is to be avoided by a later well being drilled, or may be an existing well that has blown out, and is to be intercepted at a selected depth below the surface of the earth by a relief borehole. Alternatively, well 10 may represent some other anomaly located in the earth, such as an electrically conductive geological formation, a drill string in an uncased well, or some other electrically conductive material which may be a target for interception or avoidance. For purposes of this disclosure, such material will be referred to as the target well, or just the target.

Near the target 10 is a second borehole 14 which is being drilled, and which is to be directed so as either to intersect the target or to avoid it. For convenience, the well 14 will be referred to as a relief borehole, and the system and method of the invention will be described in terms of a relief borehole being drilled to intersect a target cased well at a desired depth below the surface of the earth.

Borehole 14 typically begins at a wellhead 16 at the surface 18 of the earth, and may be relatively close to the wellhead 20 of target Well 10, or may be spaced by a distance of as much as one half mile in the case where well 10 has blown, but has not been capped. Suitable derricks and other conventional well drilling equipment (not shown) are located at the wellhead 16 by means of which a drill string 22 is supported in well 14 in known manner. At the wellhead 16 subsections or drill collars are secured end to end to form the drill string, and are lowered into the well as drilling progresses in conventional manner. Drilling mud is supplied to the interior bore 24 of the string 22 by way of fitting 26, as indicated by arrow 28, again in conventional manner. It will be understood that this structure of the drill string and wellhead is shown only diagrammatically, since that structure is conventional and forms no part of the invention.

The bottom-most drill string subsection 30 carries the drill bit 32, as diagrammatically illustrated. The drill bit subsection 30 may be a bent sub, as shown, which angles the drill bit with respect to the axis of the drill string to permit changes in the direction of drilling, or may be a straight section for straight-ahead drilling. With the use of a bent sub, the direction of drilling may be controlled by rotating the entire drill string from the wellhead, thereby turning the bent sub.

As is known, the drill bit may be driven by a motor 34 which in turn is driven by the flow of drilling mud 28 down the drill string bore. The mud flows out of the drill string at the bent sub and around the location of the drill bit as indicated by arrows 36 and flows up and out of the well 14 through the annular space 38 around the outside of the string 22, carrying the material loosened by the drill up and out of the well through outlet fitting 40.

Located within the drill string bore 24 is an alternating magnetic field detector, or magnetometer, diagrammatically illustrated at 44. The detector 44 is adapted to detect alternating magnetic fields produced in the earth surrounding the target by alternating current flow induced in the conductive material (such as casing 12) of target well 10. This current preferably is induced by way of an electrode diagrammatically illustrated at 46 and located at the surface 18 of the earth very close to, or, in the preferred form of the invention, electrically connected to, the casing 12. The electrode induces a current flow I, indicated by arrow 48, in the electrically conductive target casing, and this vertically flowing current produces a magnetic field surrounding casing 12, indicated by the dotted lines 50. As indicated, the magnetic field lines are perpendicular to the direction of current flow I, and thus are generally horizontal when the well is vertical. The field 50 extends outwardly from the target well casing 12 to a distance dependent upon the magnitude of the current flow 48 and upon the nature of the strata surrounding the target well and the relief borehole.

The electrode 46, which may be a conductive rod located in the earth near the wellhead or may be a connector for securing a cable to the metal casing 12, is connected by way of a cable 52 to a source 54 of alternating current. The other side of the AC source 54 is connected to a ground point 56 at a location spaced away from the target well by a distance sufficient to ensure that the current 48 will flow primarily in the casing 12. As the current flows downwardly in the casing, it will gradually be dissipated outwardly into the surrounding earth, and will return to the ground electrode 56, but since the current flow in the casing is highly concentrated, as compared to the current flow through the earth, the magnetic field produced by the casing current 48 will predominate and will be detectable by the magnetometer 44.

The magnetometer 44, which may be a highly sensitive magnetic field detector such as that described in U.S. Pat. No. 4,933,640, includes a pair of field sensors 60 and 62 each having two spaced, parallel legs, such as legs 64 and 66 in sensor 60. The legs may be ferrite rods, each several inches long and surrounded by corresponding solenoidal windings 68 and 70. The magnetometer preferably is located in a suitable housing within the central opening 24 of the drill string but alternatively may be mounted on the exterior thereof, as in reduced areas or notches formed on the outer surface of the drill string. In this latter configuration, diagrammatically illustrated in the figure, the two legs of each sensor are mounted on diametrically opposite sides of the drill string so that they are spaced apart by a distance approximately equal to the diameter of the drill string. In either arrangement, the two legs of each sensor have their axes of maximum sensitivity parallel to each other, and perpendicular to the axis of the drill string, while the axes of maximum sensitivity 74 and 76 of the two sensors 60 and 62, respectively, are perpendicular to each other.

The sensors 60 and 62 preferably are located near the bottom of the drill string; for example, in the penultimate drill string collar 78, hereafter referred to as the sensor collar, so as to detect the alternating magnetic field as near the face of drill 32 as possible. Although significant vibration occurs at this location when measuring while drilling, nevertheless it is often very desirable to measure the field at the bottom of the borehole being drilled.

The magnetometer 44 has a fixed rotational position with respect to the drill string, thereby fixing the angular relationship between the magnetometer and the bent sub 30, so that the output signals from the sensors 60 and 62 can be used to determine the direction in which the bent sub is facing relative the target, and thus can be used to control the direction of drilling.

If the magnetometer is mounted in a housing, it may be aligned within the sensor collar by means of radially extending spacers (not shown) which serve to engage a suitable detent; for example, in the form of a slot formed on the interior of the drill string sensor collar. The slot guides one of the spacers, which may be longer than the remaining spacers, into the slot as the magnetometer housing is lowered into the sensor collar, and causes the magnetometer housing to rotate into a predetermined angular relationship with the sensor collar 78 and with the bent sub 30. Since the magnetometer of the present invention remains within the drill string during the actual drilling operation, it will ordinarily be aligned in the sensor collar 78 at the surface, with the detent or slot arrangement insuring that the relationship between the sensor and the bent sub is known and remains constant during the drilling operation. The spacers also serve to align the magnetometer housing with the axis of the drill.

In order to permit the sensor to measure magnetic fields external to the drill string, the sensor collar is fabricated from a nonmagnetic material such as stainless steel or Monel. Since the drill string 22, and thus the collar 78, may carry a small portion of the electric current produced by the electrode 46, and since that current will produce stray magnetic fields within the interior of the drill string that will adversely affect the magnetometer's ability to detect exterior magnetic fields, care should be taken to minimize such effects.

When a relief borehole is being drilled, the borehole is initially directed toward the target through the use of conventional methods. The magnetometer of the present invention is located within the drill string or on its surface, and is operable during the actual drilling, although for greatest accuracy the drilling operation would normally be momentarily halted while measurements are made. The information obtained from the magnetometer is used to control the directional drilling of the relief borehole.

Figure 2A:
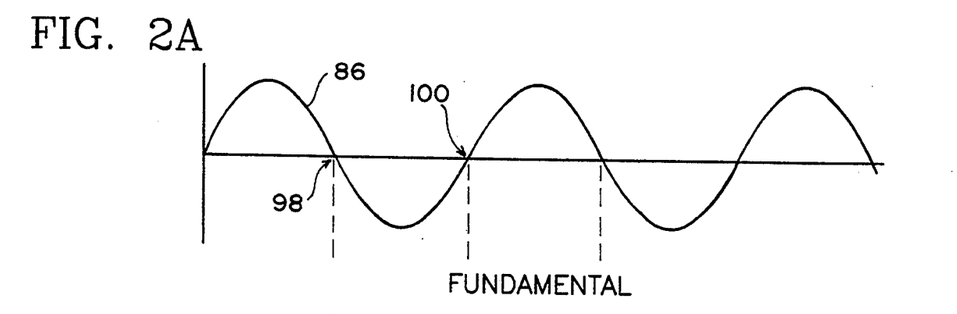
FIGS. 2A, 2B and 2C graphically illustrate the waveform of the injected current.
Figure 2B:
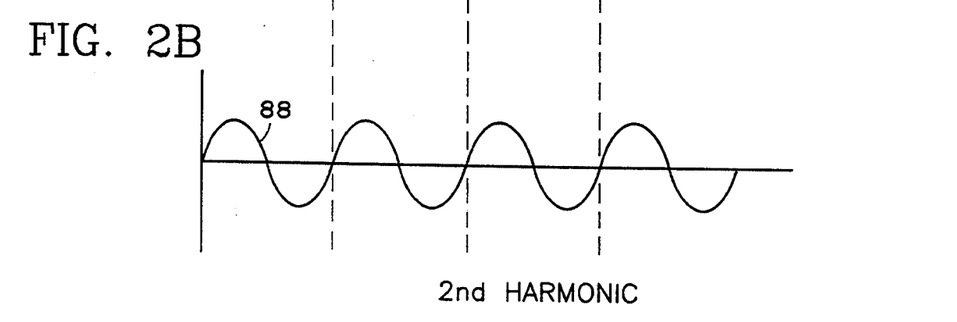
Figure 2C:
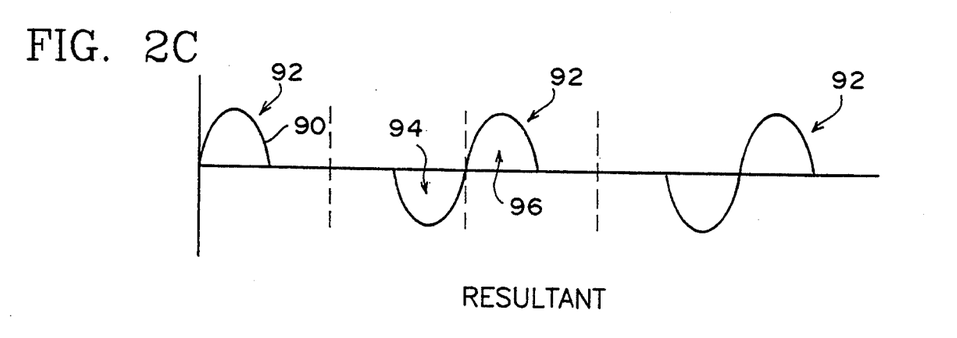

The surface current source 54 preferably is an SCR inverter circuit with provision for current cutoff, and thus may include an SCR bridge 80 connected across a DC supply, such as a battery 82. The control electrodes of the SCR devices are connected to a controller 84 which is driven by a stable, accurate clock 85, such as a quartz clock, to switch the SCR devices to provide an output current of, for example, 25 amperes at 400 volts and having a fundamental frequency in the range of up to 5 Hz, but preferably 1 Hz or less, as illustrated by waveform 86 in FIG. 2A, and having an even harmonic, illustrated by waveform 88 in FIG. 2B, which preferably is a second harmonic. Waveforms 86 and 88 each may be alternating square waves or may be sinusoidal, and include first and second oppositely-going zero crossings in each cycle. The two waveforms 86 and 88 combine to produce a resultant current, illustrated by waveform 90 in FIG. 2C, in the earth which, in turn, produces current I in the target. This target current produces the magnetic field 50 which also has that same waveform.

The resultant magnetic field 50 consists of a series of low-frequency resultant pulses 92 (FIG. 2C) which have a different characteristic waveform at each zero crossing in one cycle of the fundamental waveform 86. Thus, for example, at the zero crossing 98 in a first cycle of waveform 86, the combination of waveforms 86 and 88 results in no signal in waveform 90, whereas at zero crossing 100 of waveform 86 in the first cycle, there is a resultant pulse 92 in waveform 90. Thus, the waveform 90 has different characteristics (e.g., no pulse, or pulse) at each of the successive zero crossings which occur in each cycle of the fundamental wave. The detected magnetic field has the same distinctive characteristics, so that calculations based on the measured field can be synchronized with the fundamental frequency, without phase ambiguity to assure directional accuracy of the calculated values.

In operating the system of the present invention, a two-part alternating electric current is supplied to the electrode 46 at or very close to the wellhead 20 of the target well, causing a resultant current I to flow through the steel casing 12 in the target well. The resultant low frequency alternating current, indicated by arrows 48, produce the target magnetic field 50 which can be detected by the AC field sensor (magnetometer) 44 in the drill string. Analysis of the measured alternating field pattern provides information as to the direction from the sensor 44 to the source of the magnetic field 50, and this directional information is used to control conventional guidance equipment (not shown) to direct the drill bit 32 so that drilling can be continued to either intersect or to avoid the casing 12, depending upon the purpose of the drilling operation. By utilizing a low frequency, two-part alternating current consisting of a fundamental waveform and an even harmonic from source 54, not only is phase ambiguity eliminated, but the effects of the earth's magnetic field on the sensor and on the target well casing are reduced, further increasing the accuracy of measurement.

The magnetometer 44 may include external sensors such as those illustrated at 60 and 62 in FIG. 1, or the sensors may be enclosed entirely in an electronics housing within the drill string. A suitable housing for the downhole electronics is illustrated in U.S. Pat. No. 4,529,939 and is diagrammatically indicated at 110 in FIG. 1 of the present application. Although the housing is illustrated outside the drill string for convenience in FIG. 1, it will be understood that in actual practice it is located within the drill string. The housing 110 contains sensors 112 and 114 which make up the X and Y components of an inclinometer and provide outputs on respective lines 116 and 118 which are a measure of the vector components of the earth's gravitational field in the borehole 14. These outputs provide a measure of the slope of the borehole with respect to the vertical direction of the earth's gravitational field, and thus of the rotational orientation of the instrument in the borehole. The system may also incorporate a compass having X and Y sensors 120 and 122 producing outputs on respective lines 124 and 126 corresponding to the vector components of the earth's magnetic field.

The output signals from magnetic field sensors 60 and 62 are supplied by way of corresponding output lines 130 and 132 to corresponding band-pass amplifiers 134 and 136, respectively, the outputs of which appear on output lines 138 and 140.

The signals from the various sensors carried on lines 116, 118, 124, 126, 138 and 140 are supplied to respective inputs of a multiplexer 142 which samples these outputs sequentially and supplies the sampled signals by way of output line 144 to the input of an analog to digital converter 146. The digital output signals from converter 146 are fed by way of line 148 to a computer 150, which is driven by a stable, accurate clock 151, which may also be a quartz clock synchronized with clock 85 at the start of the drilling operation, before the MWS system is lowered into the borehole. This computer utilizes the output signals from sensors 60 and 62 to calculate the direction from the drill stem 22 to the source of the magnetic field 50, which direction is illustrated by vector 152 at an angle Θ from compass north (N). This direction also points to the casing or other electrically conductive material in the target well 10. The outputs of inclinometers 112 and 114 are used in combination with the signals from the magnetometer sensors 60 and 62 to resolve the magnetic field vectors received by those sensors, and the outputs from the compass sensors 120 and 122 provide orientation for the drill string with respect to the earth's magnetic field.

The computer 150 controls the multiplexer 142 to repeatedly scan the sensors 112, 114, 120 and 122 and the outputs from magnetometers 60 and 62, to thereby accumulate data from the sensor for use in calculating the value of vector 152. The computer 150 relates the phase of the source current 48 to the measured signal by means of the shape of the resultant waveform 90, so that the angle Θ can be determined without ambiguity.

The calculated value of vector 152 is in the form of digital signals which are supplied by the computer 150 by way of line 153 to a telemetry drive circuit 154 which supplies output signals by way of line 156 to a transmitter such as a mud pulse transmitter 158 located in the path of the drilling mud inside the drill string 22. Pulses produced by transmitter 158 in the drilling mud are detected by a pulse sensor 160 at the surface, which may be located at the inlet for the drilling mud, the sensor producing output signals on line 162 which are supplied through a pulse decoder 164 to a drill control 166 which may include recording equipment, a display for showing the relative locations of the target and the drill, and the like. The information so displayed may be used to redirect the drill bit 32, as by rotating the drill string 22 to reorient the bent sub 30 and to control the operation of the drill bit 32.

The downhole electronics, including the computer, the multiplexer, the converter, and the telemetry drive circuits preferably are operated by means of a battery pack located in the housing 110 or by means of a drilling mud turbine which responds to the flow 28 of the drilling mud to drive an electrical generator.

Although the present invention is described in terms of preferred embodiments, it is desired that the true spirit and scope thereof not be so limited, but be limited only by the following claims.

What is claimed is:

1. A method of measuring while drilling the magnetic fields produced by a current flowing in or around an electrically contrasting target well casing to permit continuous unambiguous determination of the direction to the target from a borehole being drilled, comprising:

securing a housing incorporating a magnetic field detector within a non-magnetic drill string section forming a part of, and located near the bottom of, a drill string located in a borehole being drilled, said detector including means for measuring X and Y component values of ambient magnetic fields;

aligning the detector with respect to a drill bit in said drill string;

positioning an electrode near a target well having a casing;

supplying two-component low frequency alternating current including a fundamental wave component and an even harmonic wave component to said electrode to produce a resultant alternating current flow in said target well casing and to thereby produce a corresponding alternating magnetic field in the earth around said target well;

measuring with said magnetic field detector X and Y component values of the alternating magnetic field produced in the earth by said resultant alternating current flow;

converting said measured component values to digital information representing said alternating magnetic field;

accumulating said component value digital information within said housing and determining from said accumulated digital information the vectorial distance and direction to said target well from said detector, the determination being made in synchronization with said fundamental wave component to eliminate phase ambiguity in the determination of the direction;

supplying data representing said distance and direction to transmitter means in said drill string; and transmitting said distance and direction data to the surface of the earth.

2. The method of claim 1, wherein the step of supplying alternating current to said electrode includes connecting a controllable power supply between said electrode and a ground electrode located at the surface of the earth at a distance from said target well sufficient to produce current flow in said target well at a depth of interest.

3. The method of claim 1, wherein the step of securing said detector housing in a drill string includes mounting said housing coaxially within a nonmagnetic sensor collar, whereby stray magnetic fields due to current flow in said sensor collar are substantially cancelled at said sensor.

4. The method of claim 1, wherein said fundamental wave component has first and second zero crossings in a cycle, and wherein said resultant magnetic field has different characteristics at times corresponding to said first and second zero crossings, whereby said vectorial distance and direction are determined without ambiguity.

5. Logging apparatus for measuring while drilling magnetic fields produced by alternating current flow in a target well including electrically conductive material to permit continuous determination of the location of the target well with respect to a borehole being drilled, comprising:

an alternating magnetic field detector;

means mounting said detector coaxially within a nonmagnetic section of a drill string located in a borehole being drilled;

a current injecting electrode;

means positioning said electrode near a target well;

means supplying alternating current to said electrode for injecting said current into said target well so that the injected current produces a corresponding target alternating magnetic field surrounding said target well, said alternating current having a first fundamental wave component and having an even wave component which is a second harmonic of said first wave component;

said field detector including sensors measuring X and Y vector components of said target alternating magnetic field in the region of said nonmagnetic drill string section and producing corresponding X vector and Y vector detector signals;

means converting said detector signals to corresponding detector digital signals;

computer means located in said borehole and responsive to said detector digital signals to produce output signals corresponding to the distance and direction from said borehole to target well, the determination being made in synchronization with said fundamental wave component to eliminate phase ambiguity in the determination of the direction;

transmitter means responsive to said computer output signals for transmitting said output signals to the earth's surface; and sensing means at the earth's surface for receiving said transmitted output signals, whereby said output signals are available for controlling the direction of drilling said borehole.

6. The logging apparatus of claim 5, wherein said sensor is located near the bottom of said drill string, and is adjacent a drill bit.

7. The logging apparatus of claim 6, wherein said sensor means is coaxially mounted within said nonmagnetic section and is aligned with said drill string, whereby the orientation of said drill bit with respect to said sensor is fixed.

8. The logging apparatus of claim 7, wherein said sensor is located near the bottom of said drill string and is coaxially mounted therewithin, and wherein said sensor section has walls of substantially uniform thickness to distribute stray electrical currents around the circumference thereof so that any magnetic fields produced by said stray currents tend to be cancelled at said sensor means.

9. The logging apparatus of claim 8, further including a second electrode, said means supplying alternating current being connected between said electrodes.

10. The logging apparatus of claim 9, wherein said second electrode is located at the surface of the earth at a location spaced away from said target well casing.

11. The logging apparatus of claim 5, wherein said means supplying alternating current includes means generating said fundamental wave component to include first and second zero crossings in each alternating current cycle, said fundamental and even wave components producing a resultant target well current and corresponding target well alternating magnetic field having different characteristics at said first and second zero crossings to distinguish the phases of said alternating current and to thereby eliminate directional ambiguity in said output signals corresponding to distance and direction.

12. A method of unambiguously determining the direction to a target well from a borehole being drilled, comprising:

supplying two-component low frequency alternating current to a target well in the earth, the well having an electrically conductive casing, said current including a fundamental wave component having two opposite zero crossings per cycle and an even harmonic wave component having two opposite zero crossings per cycle and producing in said target well casing a resultant alternating current flow having a different characteristic waveform at each zero crossing in each cycle of said fundamental component;

said resultant alternating current flow producing in the earth around the target well a resultant magnetic field coaxial with said casing, said magnetic field having a waveform corresponding to said resultant alternating current flow and thereby having a different characteristic waveform at times corresponding to each zero crossing in each cycle of said fundamental component;

measuring in a borehole being drilled in the earth x and y component values of said resultant alternating magnetic field;

accumulating said measured x and y component values over plural cycles of said fundamental component; and determining from said accumulated values the vectorial distance and direction from said borehole to said target well, the determination being made in synchronization with said fundamental wave component to eliminate phase ambiguity in the determination of direction.

13. The method of claim 12, wherein the step of supplying low frequency alternating current comprises supplying sinusoidal fundamental and even harmonic wave components.

14. The method of claim 13, wherein the step of supplying low frequency alternating current further comprises supplying a fundamental wave component having a frequency of between 1 and 5 Hz.

15. The method of claim 12, wherein the step of supplying low frequency alternating current comprises supplying square wave fundamental and even harmonic components.

16. The method of claim 12, wherein the step of measuring includes measuring while drilling said borehole.

* * * * *

UNITED STATES PATENT AND TRADEMARK OFFICE
CERTIFICATE OF CORRECTION

PATENT NO. : 5,343,152

DATED : August 30, 1994

INVENTOR(S) : Arthur F. KUCKES

It is certified that error appears in the above-identified patent and that said Letters Patent is hereby corrected as shown below:

On title page, item [54] and col. 1, line 2, change "FUNAMENTAL" to
--FUNDAMENTAL--.

Signed and Sealed this

Eighth Day of November, 1994

Attest:

BRUCE LEHMAN

Attesting Officer

Commissioner of Patents and Trademarks